United States Patent [19]
Knauer

[11] Patent Number: 5,935,222
[45] Date of Patent: Aug. 10, 1999

[54] ARRANGEMENT WITH A SIGNAL PROCESSING CONNECTION AND A FUNCTIONAL UNIT

[75] Inventor: Detlev Knauer, Ammerthal, Germany

[73] Assignee: Siemens Aktiengesellschaft, München, Germany

[21] Appl. No.: 08/793,192
[22] PCT Filed: Jun. 30, 1995
[86] PCT No.: PCT/DE95/00852
  § 371 Date: May 7, 1997
  § 102(e) Date: May 7, 1997
[87] PCT Pub. No.: WO96/06386
  PCT Pub. Date: Feb. 29, 1996

[30] Foreign Application Priority Data

Aug. 19, 1994 [DE] Germany ............................. 44 29 278

[51] Int. Cl.⁶ ........................................................ G06F 3/00
[52] U.S. Cl. ............................. 710/14; 710/46; 370/340; 340/825.08
[58] Field of Search ..................... 395/834, 846, 395/848, 651, 866; 370/346, 449; 340/825.08

[56] References Cited

U.S. PATENT DOCUMENTS

| | | | |
|---|---|---|---|
| 4,775,976 | 10/1988 | Yokoyama | 371/9 |
| 4,833,702 | 5/1989 | Shitara et al. | 379/60 |
| 4,930,011 | 5/1990 | Kiewit | 358/84 |
| 4,951,235 | 8/1990 | Mori | 364/550 |
| 5,535,398 | 7/1996 | Biggs et al. | 395/750 |
| 5,541,589 | 7/1996 | Delaney | 340/870.02 |
| 5,586,056 | 12/1996 | Watanabe | 364/550 |
| 5,611,074 | 3/1997 | Kantz et al. | 395/473 |

FOREIGN PATENT DOCUMENTS

| | | |
|---|---|---|
| 0 352 683 | 1/1990 | European Pat. Off. . |
| 0 421 471 | 4/1991 | European Pat. Off. . |
| 0 559 163 | 9/1993 | European Pat. Off. . |
| 94/15299 | 7/1994 | WIPO . |

Primary Examiner—Hassan Kizou
Assistant Examiner—Abu Hossain
Attorney, Agent, or Firm—Kenyon & Kenyon

[57] ABSTRACT

An arrangement wherein peripheral modules of a decentralized peripheral system connected to an automation unit can be identified. To do so, the peripheral modules of the decentralized peripheral system are equipped with a device that converts a polling signal sent to it into an identification signal during an identification mode. The arrangement can be used in decentralized peripheral systems of programmable control systems.

12 Claims, 2 Drawing Sheets

ARRANGEMENT WITH A SIGNAL PROCESSING CONNECTION AND A FUNCTIONAL UNIT

This application is a 371 of PCT/DE95/00852, filed Jun. 30, 1995.

FIELD OF THE INVENTION

The present invention relates to an arrangement for identifying installed plug-in devices, and in particular to an arrangement for identifying installed plug-in devices attached to a decentralized peripheral system.

BACKGROUND OF THE INVENTION

In modular automation systems, it is desirable to adapt the input and output components of the system to the conditions prevailing in a given industrial process with regard to the use of actuators and sensors. To do so, the CPU of the system must determine the type of configuration to determine the consistency between a projected structure assumed in the user program and the actual structure, e.g. for diagnostic purposes. International patent application WO 94/15299 describes an arrangement with a CPU that detects whether functional units have been plugged into the module slots of the arrangement. For this purpose, the plug-in units have level switching devices that switch the level of the address line assigned to them in the event the units receive a module slot identification signal from the CPU during the read access time.

To reduce the number of input and output components installed in automation systems despite a high degree of expansion, decentralized peripheral systems are used, e.g., in the form of an "active terminal." A case with peripheral modules is moved to the process actuators and sensors, and only one interface module, which is connected to the decentralized peripheral system by a cable, is necessary in the automation unit. The arrangement proposed in international patent application WO 94/15299 can detect whether the interface connection is plugged into a module slot in the automation unit, but it cannot recognize whether the peripheral modules are present in the decentralized peripheral system.

The object of the present invention is to create an arrangement of the type defined in the preamble, wherein an installed or plug-in functional unit can be identified. In addition, an identifiable functional unit is to be created that can be identified even if it is set up at a separate location from its signal processing connection.

Additional embodiments of the present invention are derived from the subclaims.

The device of the functional unit may be designed to be active or passive. An active device has the means for producing an identification signal from a voltage generated in the device itself. A passive device, however, converts a voltage supplied by the signal processing connection into an identification voltage. The voltage of the interface connection and the identification voltage are preferably transmitted over the available signal line.

The present invention as well as embodiments and advantages are explained in greater detail below with reference to the figures, which illustrate one embodiment of the present invention.

DETAILED DESCRIPTION OF THE INVENTION

Figure 1:
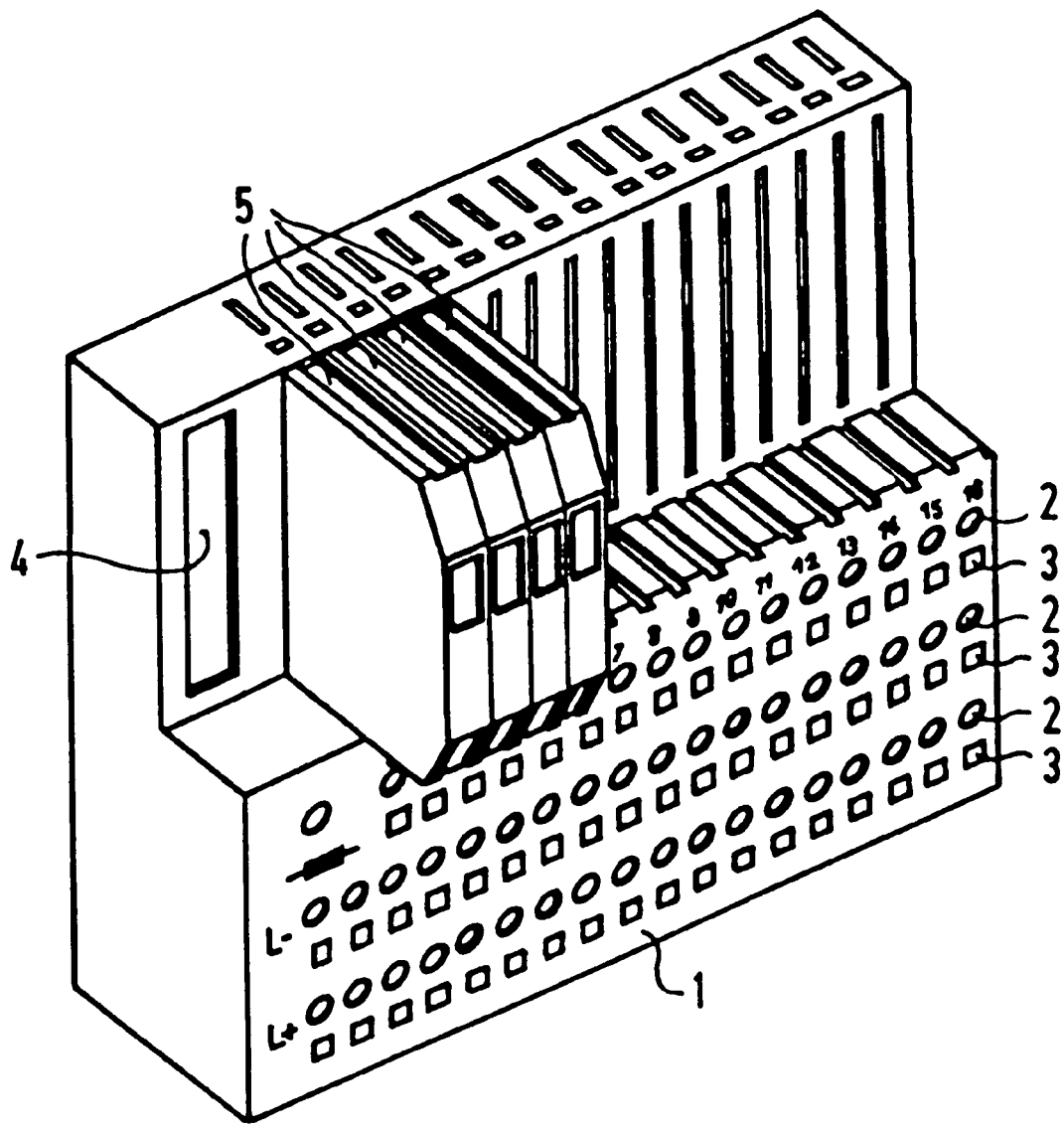
FIG. 1 shows a decentralized peripheral system according to the present invention.

FIG. 1 shows a case 1 of a decentralized peripheral system equipped with three rows of orifices 2. These orifices 2 have, for example, screwless spring terminals for connecting external lines that can be released by control orifices 3. Inside case 1 there are installed digital input and output modules 5 whose inputs are connected to cable terminal 4 and whose outputs are connected to orifices 2 by a circuit-board (not shown here) in case 1. Orifices for potential conductors designated as L– and L+ are provided, for example at the left end of a row of orifices 2 and serve to run the potential conductors to a fuse module with a fuse that can be replaced from the front. A ribbon cable that can be connected to cable terminal 4 connects decentralized peripheral system 1 to a signal processing interface connection 7 (FIG. 2) of an automation unit. Each digital input and output module is provided with three orifices 2 to which actuators or sensors can be connected using a three-wire terminal. Two of these three orifices 2 receive a supply voltage for the sensors/actuators, and one orifice is provided for connecting a signal line. In the present example, sixteen digital input and output modules can be plugged into the decentralized peripheral system, so the ribbon cable connected to cable terminal 4 must have a total of eighteen lines, sixteen of which are provided for signal transmission between the interface connection and the maximum of sixteen modules that can be installed or plugged in and two lines are provided for, for example, a +5 V, M5 V power supply. From the +5 V, M5 V power supply, modules 5 form suitable power supply voltages at two of the three orifices 2 for the connected sensors/actuators. A labeling area bearing identification numbers 1 through 16 (1 through 6 are concealed in the figure) of the individual terminals is provided above the spring terminals.

Figure 2:
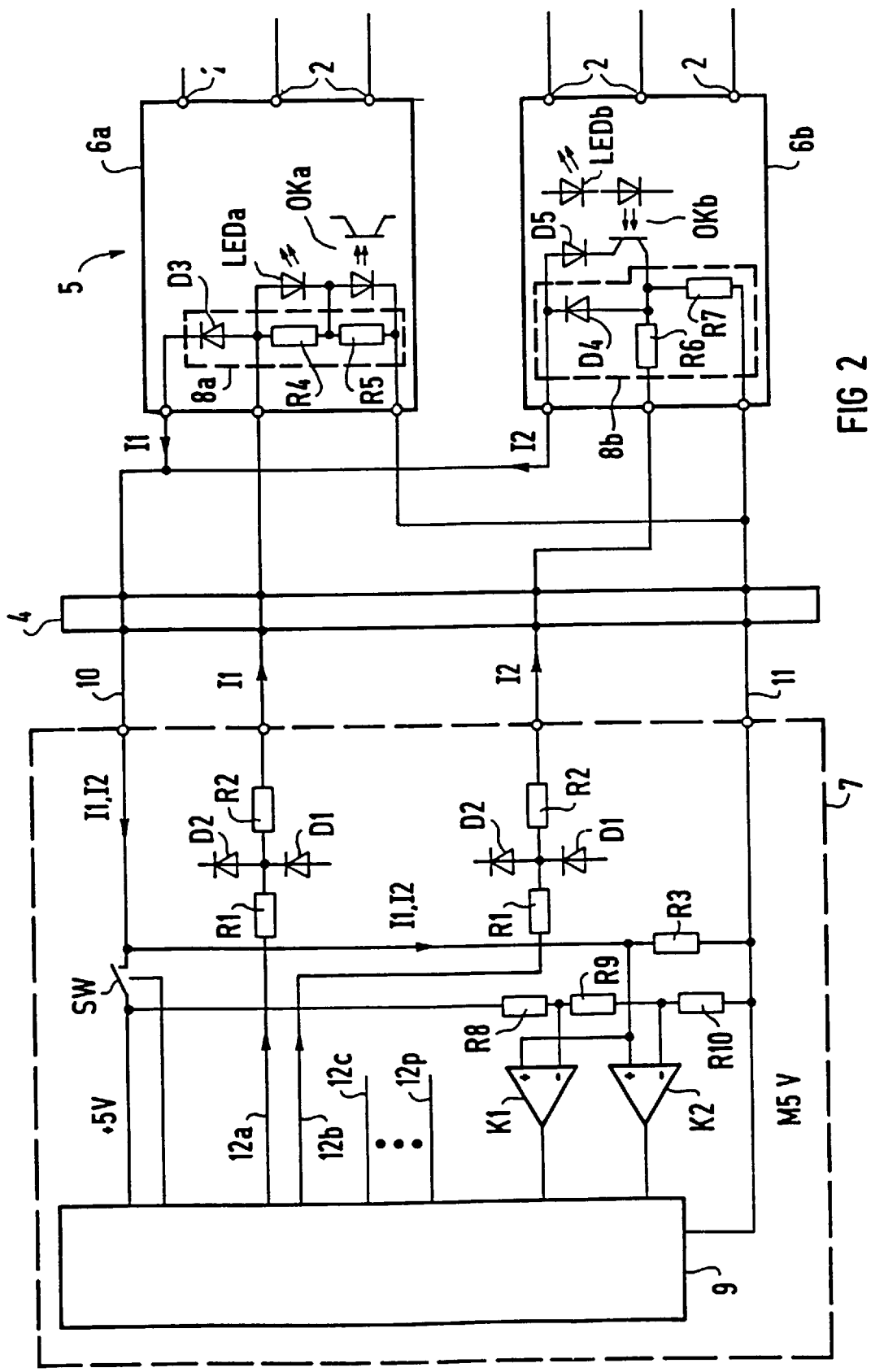
FIG. 2 shows a schematic diagram of the signal processing connection of an automation unit according to the present invention with digit input/output unit connected thereto.

To illustrate the functioning of signal processing connection 7 of the automation unit with regard to identification of digital input and output modules 5 installed in the decentralized peripheral system, reference is made to FIG. 2, which shows a schematic diagram of this signal processing connection 7 with two digital input and output modules 5 connected. The same parts occurring in FIGS. 1 and 2 are labeled with the same notation. One of modules 5 is designed, for example, as a digital output module 6a and the other is designed as digital input module 6b, where output module 6a includes device 8a formed by resistors R4, R5 and diode D3, optical coupler OKa and light-emitting diode LEDa to display the signal status; input module 6b includes optical coupler OKb, light-emitting diode LEDb and device 8b consisting of resistors R6, R7 and diode D4.

In the mode referred to as "normal", a power supply and identification device 9 of interface connection 7 provides a power supply of +5 V and M5 V to modules 6a, 6b via lines 10, 11 of the ribbon cable and via cable terminal 4. For this purpose, controllable switch SW is closed, and in this mode the respective signal lines 12a through 12p receive signals in the form of 0 or 1 levels. In the event that module 5 is a digital output module (module 6a in the example), power supply and identification device 9 supplies a 0 or 1 level to this output module over the respective line 12a according to the specifications of a control program; in the case of a digital input module (module 6b in this example) this module supplies device 9 with a 0 or 1 level over line 12b, where the level corresponds to a value measured at the measured value inputs (orifices 2) of the module. Each of the sixteen signal lines 12a through 12p has an input circuit consisting, for example, of resistors R1, R2 and isolating diodes D1, D2, where the functioning of diodes D1, D2 is not relevant to this invention and therefore is not explained further here.

In a mode of operation referred to as "identification," initiated by interface connection 7 cyclically or after preset periods of time, power supply and identification device 9 opens switch SW, so the supply voltage of +5 V, M5 V to modules 5 is interrupted. Instead, power supply and identification device 9 supplies a test voltage, usually 5 V, to modules 5 one after the other over signal lines 12a through 12p. The components of devices 8a, 8b of the digital input and output modules are designed with dimensions such that at this test voltage, outputs 2 of digital output module 6a do not complete the circuit and any triggered inputs 2 of digital input module 6b do not affect interface connection 7 with regard to the identification of this module. It is assumed that device 9 first sends a test voltage of 5 V to digital output module 6a over signal line 12a. Therefore, current I1 flows through resistors R1, R2, diode D3 and input resistor R3 of comparators K1, K2. An identification voltage that is reduced by the voltage drop at resistors R1, R2 and diode D3 is formed at this input resistor R3. Input circuit of comparators K1, K2 includes, for example, additional resistors R8, R9, R10, where these resistors and resistor R3 are designed so that a level of 1 is present at the output of comparator K1 as well as the output of comparator K2. Resistors R4 and R5 are designed with a high resistance in comparison with resistor R3, so that current I1 flows largely over power supply line 10 to resistor R3. The voltage on resistors R4 and R5 is so low that optical coupler OKa and light-emitting diode LEDa are not flooded. On the basis of a processing procedure stored in power supply and identification device 9, device 9 recognizes from bit combination 1, 1 of the output signal levels of comparators K1, K2 that module 6a is a digital output module. After this identification, device 9 supplies module 6b with a test voltage of +5 V over line 12b, so current I2 flows across resistors R1, R2, resistor R6, diode D4 and resistor R3. Resistor R6 of device 8b is designed so that a voltage drop at resistor R3 causes an output level of 0 on comparator K1 and an output level of 1 on comparator K2. Resistor R7 is also designed with a high resistance in comparison with resistor R3, and diode D5 prevents interface connection 7 from being negatively influenced with regard to the identification of module 6b when input 2 is activated. According to the processing procedure, device 9 of interface connection 7 recognizes a digital input module from bit combination 0, 1 of the output signal levels of comparators K1, K2. For the case when each one of comparators K1, K2 has an output level of 0 (bit combination 0, 0), device 9 recognizes that there is no module in the corresponding assembly site or module slot in the decentralized peripheral system. This is the case, for example, when device 9 supplies a 5 V test voltage to line 12c. An identification voltage of 0 V is present at resistor R3, which indicates that no module is connected to this signal line 12c.

What is claimed is:

1. A module identification arrangement, comprising:
   a functional unit including an identification device; and
   a signal processing connection connected to the functional unit via a power supply line and a signal line,
   wherein, in a normal operation mode, the functional unit receives a supply voltage from the signal processing connection, and
   wherein, in an identification mode, the signal processing connection does not provide the supply voltage and supplies a polling signal to the functional unit via the signal line, the identification device generating an identification signal as a function of the polling signal, the identification signal indicating a type of the functional unit, the identification device transmitting the identification signal to the signal processing connection via the supply line.

2. The arrangement according to claim 1, wherein, in the identification mode, the identification device converts the polling signal into the identification signal.

3. The arrangement according to claim 1, wherein the signal processing connection initiates the identification mode at predetermined times.

4. The arrangement according to claim 3, wherein the signal processing connection initiates the identification mode cyclically.

5. The arrangement according to claim 1, wherein the identification signal includes one of a first identification signal and a second identification signal, and the functional unit includes one of a digital output module and a digital input module, wherein, when the functional unit is the digital output module, the identification signal is the first identification signal, and when the functional unit is the digital input module, the identification signal is the second identification signal.

6. A module identification arrangement, comprising:
   a plurality of functional units, each of the plurality of functional units having an identification device; and
   a signal processing connection, each of the plurality of functional units connected to the signal processing connection via a respective power line and a respective signal line,
   wherein, in a normal operation mode, each of the plurality of functional units receives a supply voltage from the signal processing connection,
   wherein, in an identification mode, the signal processing connection does not provide the supply voltage and supplies a polling signal to each of the plurality of functional units via the respective signal line, each identification device generating an identification signal as a function of the polling signal, the identification signal indicating a type of the respective functional unit, each identification device transmitting the respective identification signal to the signal processing connection via the respective supply line, and
   wherein the signal processing connection includes a device which analyzes the identification signal.

7. The arrangement according to claim 6, wherein each identification device converts the polling signal into the identification signal.

8. The arrangement according to claim 6, wherein the signal processing connection initiates the identification mode at predetermined times.

9. The arrangement according to claim 8, wherein the signal processing connection initiates the identification mode cyclically.

10. The arrangement according to claim 6,
    wherein the identification signal includes one of a first identification signal and a second identification signal, and each of the plurality of functional units includes one of a digital output module and a digital input module, and wherein, for each of the plurality of functional units, when the functional unit is the digital output module, the respective identification signal is the first identification signal, and when the functional unit is the digital input module, the respective identification signal is the second identification signal.

11. A functional unit, comprising:

an identification device; and a plurality of terminals for connection, via a power line and a signal line, to a signal processing connection, each of the terminals connected to the identification device, wherein, in a normal operating mode, the signal processing connection supplies a supply voltage to the identification device, and wherein, in an identification mode, the signal processing connection does not provide the supply voltage and supplies a pooling signal to the functional unit via the signal line, the identification device generating an identification signal as a function of the polling signal, the identification signal indicating a type of the functional unit, the identification device transmitting the identification signal to the signal processing connection via the supply line.

12. The functional unit according to claim 11, wherein the identification device converts a polling signal into the identification signal, the polling signal being supplied by the signal processing connection via one of the terminals during the identification mode.

* * * * *